United States Patent [19]

Sakimori et al.

[11] Patent Number: 4,927,314
[45] Date of Patent: May 22, 1990

[54] ENGINE VALVE FEED APPARATUS

[75] Inventors: Hideharu Sakimori, Hiroshima; Susumu Ihara, Higashihiroshima; Hiroyuki Hayashi, Hiroshima, all of Japan

[73] Assignee: Mazda Motor Corporation, Hiroshima, Japan

[21] Appl. No.: 297,442

[22] Filed: Jan. 17, 1989

[30] Foreign Application Priority Data

Jan. 14, 1988 [JP] Japan ............................. 63-3389[U]

[51] Int. Cl.$^5$ ..................... B65G 1/06; B23P 19/04
[52] U.S. Cl. ................................ 414/416; 414/331; 414/225
[58] Field of Search ............... 414/417, 416, 331, 225, 414/226

[56] References Cited

U.S. PATENT DOCUMENTS

| 3,780,892 | 12/1973 | Frank ................................. | 414/417 |
| 3,926,323 | 12/1975 | Frank et al. ....................... | 414/417 |
| 4,541,762 | 9/1985 | Tischler et al. .................... | 414/416 |
| 4,588,341 | 5/1986 | Motoda .............................. | 414/417 |

FOREIGN PATENT DOCUMENTS

| 61-140831 | 9/1986 | Japan . | |
| 0206709 | 9/1986 | Japan ............................... | 414/416 |

62-15032 1/1987 Japan ..

Primary Examiner—David H. Brown
Attorney, Agent, or Firm—Fleit, Jacobson, Cohn, Price, Holman & Stern

[57] ABSTRACT

An engine valve feed apparatus which feeds engine valves to a valve handling apparatus at a valve pick-up station where the valve handling apparatus picks up and fits the engine valves to an engine cylinder head one after another. The apparatus comprises a valve hanger plate formed with a number of valve holes for tightly receiving a number of engine valves to hang the engine valves upside down. A hanger plate transfer unit transfers a number of the valve hanger plates to the valve pick-up station cone after another. An engine valve thrust-up unit is disposed at the valve pick-up station for thrusting up the valves from the valve hanger plate at the valve pick-up station so as to allow the valve handling apparatus to hold a stem of each of the engine valves. The engine valve thrust-up unit has a holding member movable up and down and formed with a number of positioning holes for receiving the stem ends of the engine valves hung from the valve hanger plate to thereby hold the valves upright when moved up. A stopper prevents the valve hanger plate from being forced up when the stem ends of the engine valves are pushed up from the valve hanger plate.

6 Claims, 11 Drawing Sheets

ENGINE VALVE FEED APPARATUS

BACKGROUND OF THE INVENTION

1. Field of Invention

The present invention relates to a parts feed apparatus equipped in an assembling line, and more particularly to an apparatus for feeding engine valves to valve handling means such as an industrial robot hand by which the engine valve is picked up and fitted or assembled to a cylinder head of a vehicle engine.

2. Prior Art

Various apparatus have heretofore been used to feed engine valves to valve handling or valve fitting means by which the engine valve is held and fitted or inserted into a valve guide of a cylinder head of a vehicle engine. One of such apparatus is disclosed in, for example, Japanese Unexamined Patent Publication No. 62-15,032 entitled "Apparatus For Inserting Valve Into Valve Guide Of Engine Cylinder Head" laid open Jan. 23, 1987. This apparatus is constructed to hold a plurality of engine valves upside down, namely with their valve heads upside, in barrel-shaped holders arranged side by side in a line for feeding them one after another. According to the apparatus above noted, although a plurality of engine valves can be fed at a time, nevertheless, the number of engine valves fed at a time are limited to a relatively low number due to the side-by-side arrangement of the barrel shaped holders. This leads to an inefficient supply of engine valves.

In an attempt at overcoming the limitation of the supply number of engine valves supplied or fed at once, an engine valve supply apparatus has been proposed in an application for Japanese Utility Model Registration Serial No. 61-140,831 filed on Sept. 12, 1986 by the assignee to whom this application was assigned, to improve the efficiency of the supply number of engine valves. This engine valve feeder includes upper and lower hanger plates, each being formed with a plurality of hanger holes in which valve stems of a plurality of engine valves are inserted and held upside down. The respective engine valves are picked up by an industrial robot hand with fingers located above a valve feed station in the assembling line in such a manner as to clamp the engine valve at its joint of valve head with the fingers.

A problem in association with the engine valve feeder is that, due to the adaptation of the robot hand to clamp the joint of valve head, the clamped engine valve is apt to shake while being transferred to a valve fitting station and there being fitted to a cylinder head. Such a shake of the engine valve makes it difficult to insert smoothly the engine valve into the cylinder head, in particular a valve guide fitted to the cylinder head.

If the robot hand clamps the stem of engine valve the engine valve will be prevented from shaking and be smoothly fitted to the valve guide of the cylinder head consequently. In order to allow the robot hand to hold clamping the stem of engine valve, it is necessary to protrude the engine valve up from the hanger plate. This, however, may result in another problem if the engine valve protruded up inclines with respect to the hanger plate and is thereby out of position for being clamped at the stem thereof by the robot hand.

SUMMARY OF THE INVENTION

According to the present invention, an apparatus is provided in a vehicle engine cylinder head assembling line for feeding engine valves to a valve handling apparatus at a valve pick-up station where the valve handling apparatus pulls or picks up and fits or assembles the engine valves to an engine cylinder head one after another. The engine valve feed apparatus of the present invention comprises a valve hanger plate formed with a number of valve holes for tightly receiving stems of a number of engine valves to hang them upside down, hanger plate transfer means for transferring a number of the valve hanger plates to the valve pick-up station one after another, and thrust-up means disposed at the valve pick-up station for thrusting up the valves from the valve hanger plate transferred to the valve pick-up station so as to allow the valve handling apparatus to hold a stem of each engine valve held.

A particular feature of the present invention resides in the provision of the thrust-up means comprising holding means movable up and down and formed with a number of holes for receiving therein a stem end of the each engine valve hung from the valve hanger plate to thereby hold the valves upright when moved up, lift means for moving up and down the holding means, and a stopper for preventing the valve hanger plate from being forced up when the holding means is moved up and receives the stem ends of the engine valves hung from the valve hanger plate. Owing to the engine valve thrust up and held upright, the handling apparatus can grip securely the stem of the engine valve, resulting in an easy, accurate assembling of engine valves to engine cylinder heads.

OBJECT OF THE INVENTION

It is, therefore, an object of the present invention to provide an engine valve feed apparatus in which engine valves can be securely held upright.

It is another object of the present invention to provide an engine valve feed apparatus which can hold engine valves in such a way as to be securely gripped and picked up with engine valve handling means provided to fit engine valves to an engine cylinder heads.

BRIEF DESCRIPTION OF THE DRAWINGS

The above and other objects of the present invention will become apparent from the following detailed description which is to be read in conjunction with the accompanying drawings in which.

DETAILED DESCRIPTION OF THE INVENTION

Figure 1:
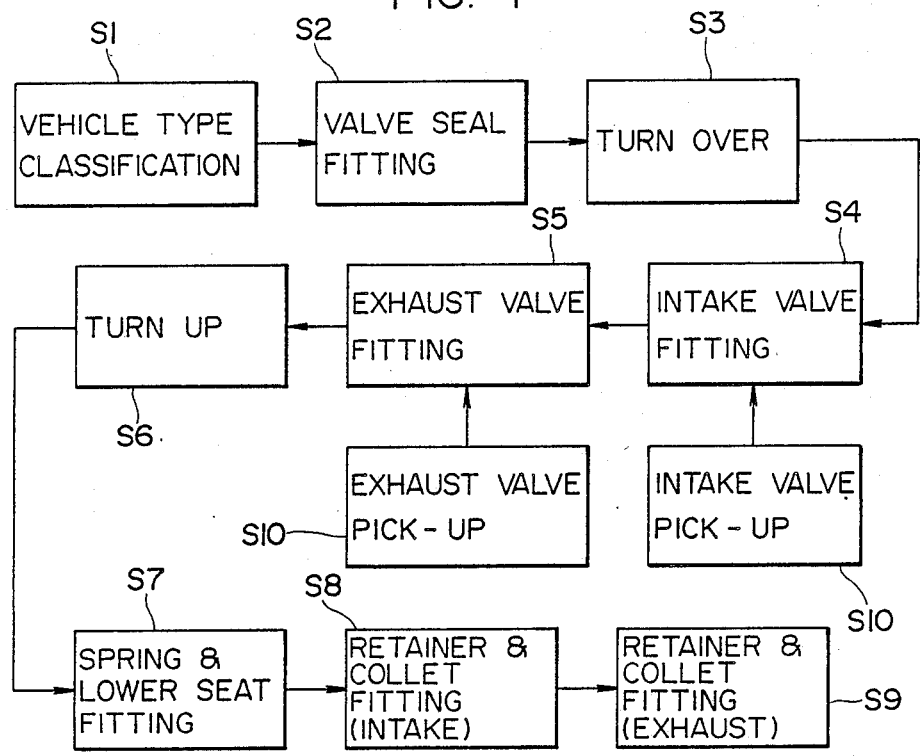
FIG. 1 is a block diagram illustrating a process of steps of assembling an engine cylinder head.

Before describing the present invention in detail, reference is had to FIG. 1 for the purpose of providing a brief description regarding a process of several steps for assembling vehicle engine cylinder heads that will enhance an understanding of the operation of an engine valve feed apparatus of the present invention. As shown in block diagram in FIG. 1, a vehicle cylinder head assembling process includes a step of bringing a cylinder head of a vehicle engine to a vehicle type classifying station S1 where the cylinder head is classified regarding the type of vehicle to which a vehicle engine attached with the cylinder head is to be assembled. After the classification of vehicle type, the cylinder head is sent to a valve seal fitting station S2 where valve seals are press-fitted to the cylinder head. Then, the cylinder head is turned over upside down at a turn-over station S3. Thereafter, the cylinder head is send to an intake valve fitting station S4 and then to an exhaust valve fitting station S5 to fit intake valves and exhaust valves thereto, respectively. After turning up the cylinder head fitted with the intake and exhaust valves to its ordinary state or posture at a turn-up station S6, various elements associating with the cylinder head, such as valve springs and lower valve spring seats, are fitted at a spring and seat fitting station S7. After this, the cylinder head is sent to an intake valve spring retainer and collet fitting station S8 and then to an exhaust valve spring retainer and collet fitting station S9 to fit valve spring retainers and valve collets to the intake valves and to the exhaust valves, respectively. After the fitting of all of the necessary valve elements to the cylinder head, the cylinder head is inspected whether all of the valves and their associated elements are properly fitted or assembled to thereby complete the assembling of cylinder head.

The above noted stations S1 to S9 are located in a cylinder head assembling line in order of reference number. In association with the respective intake and exhaust valve fitting stations S4 and S5 in the cylinder head assembling line, the engine valve feed apparatus according to the present invention are installed to feed or supply intake valves and exhaust valves, to valve handling apparatus such as an industrial robot hand, one after another, respectively. Since these engine valve feed apparatus associated with the intake and exhaust valve fitting stations S4 and S5 are identical in structure and operation, the following description will be directed to, for example, the intake valve feed apparatus.

Figure 2:
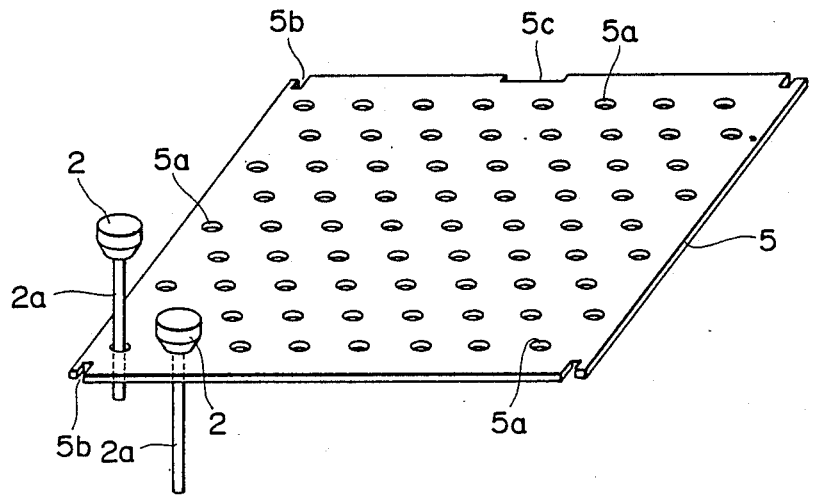
FIG. 2 is a perspective view showing a valve hanger plate.

Referring now to FIG. 2, a valve hanger plate 5 is shown having a number of, for example in this embodiment 72, valve holes 5a each of which receives tightly a stem 2a of an intake valve 2 to hold and hang the valve 2 without dangling. The valve hanger plate 5 is formed with notches 5b in both side edges near its front end and and a recess 5c in one side edge at the middle. A plurality of such valve hanger plates 5 have been prepared and are used in cooperation with the engine valve feed apparatus according to the present invention to transfer a number of intake valves to the intake valve pick-up station S10.

Figure 3:
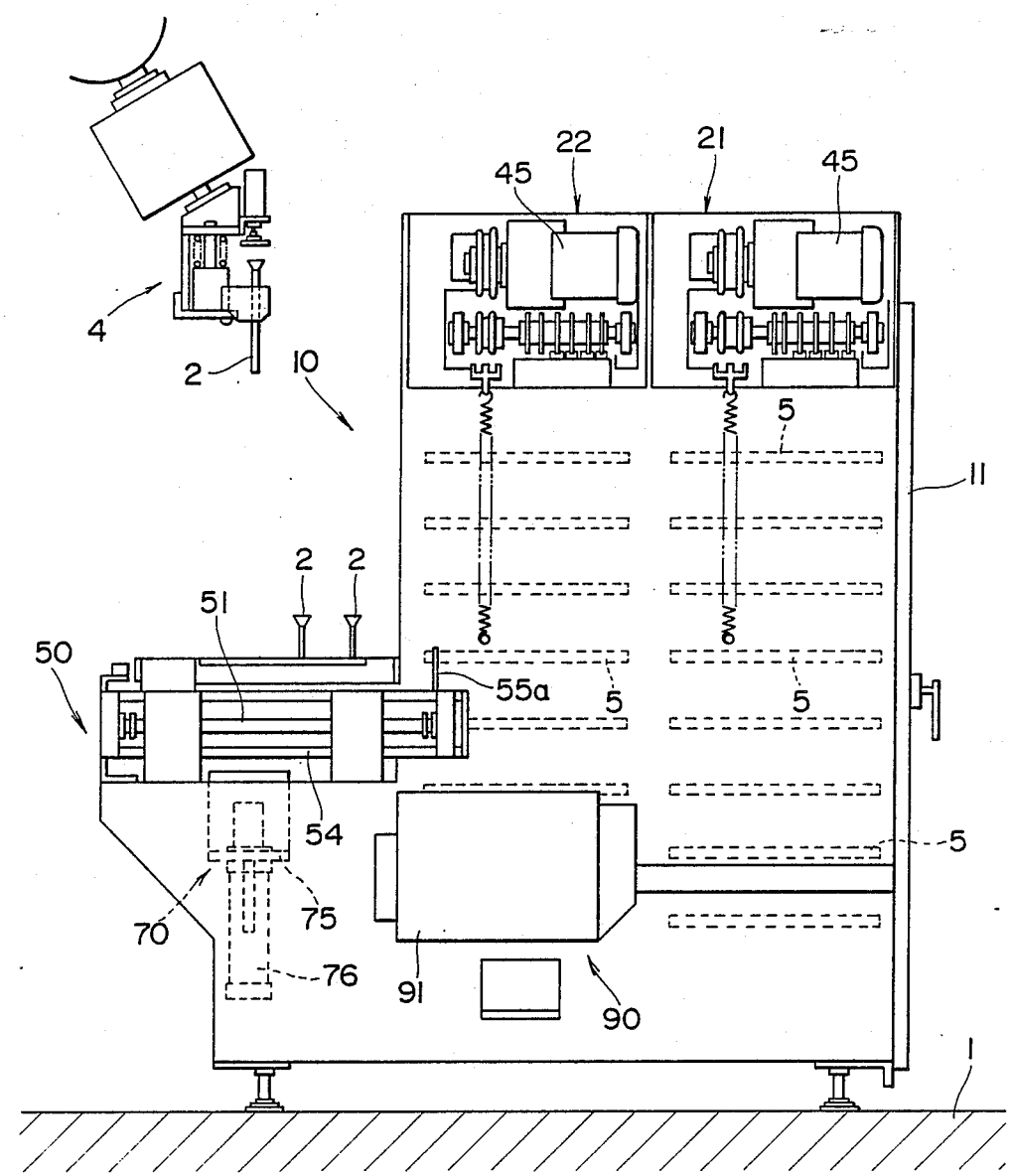
FIG. 3 is a front view showing an engine valve feed apparatus according to a preferred embodiment of the present invention.
Figure 4:
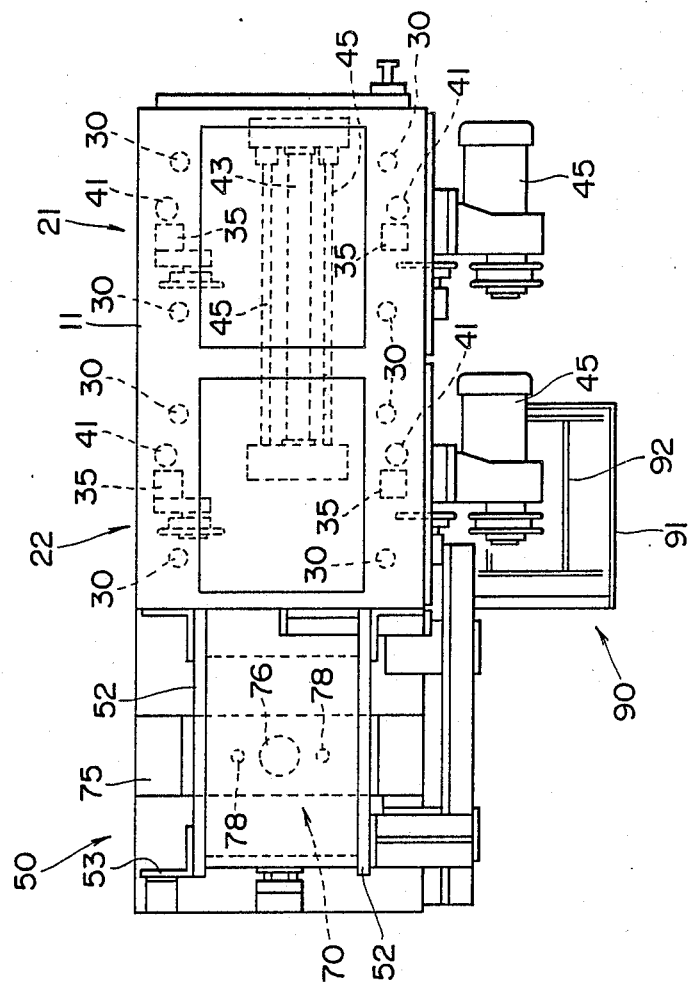
FIG. 4 is a plan view of the engine valve feed apparatus shown in FIG. 3.
Figure 5:
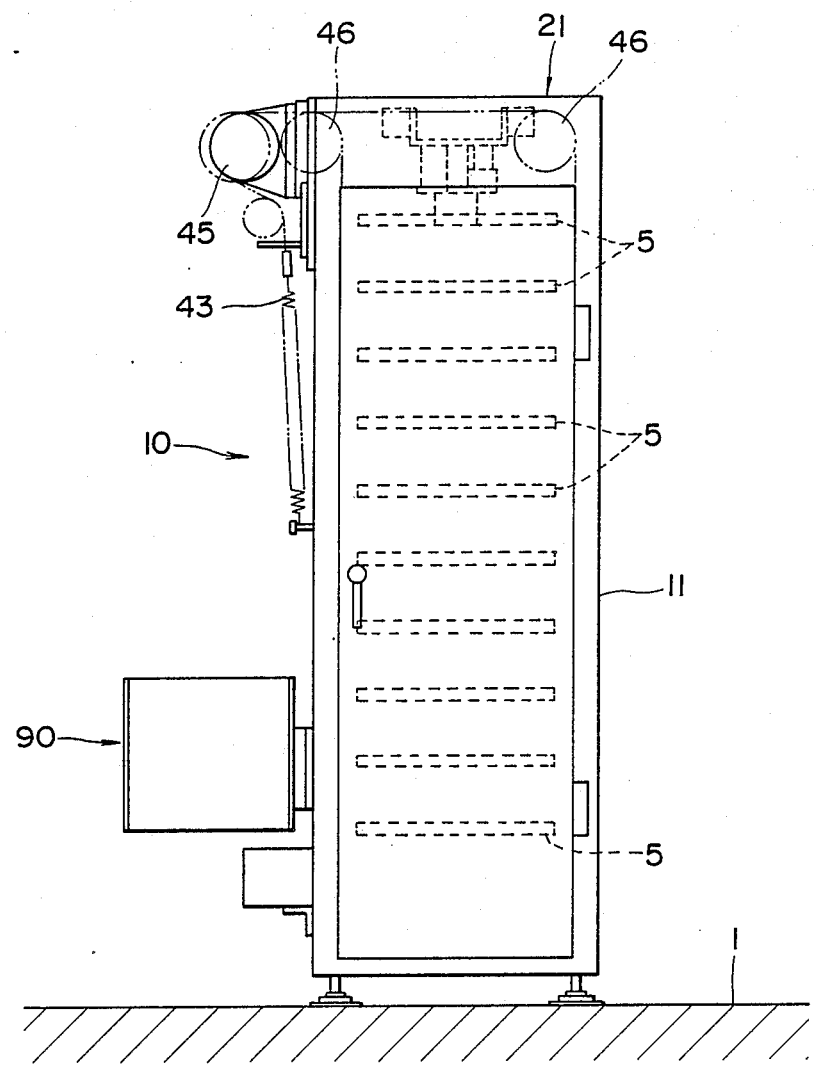
FIG. 5 is a side view of the engine valve feed apparatus shown in FIG. 3.

Referring now to FIGS. 3 to 5, the engine valve feed apparatus generally indicated by a reference numeral 10 is shown having a framed housing 11 installed on the floor 1. The engine valve feed apparatus 10 comprises first, second and third hanger plate transfer units 21, 22 and 50, and a valve thrust up unit 70, all of these units being incorporated in the housing 11. The engine valve feed apparatus 10 is so installed as to locate the valve thrust-up unit 70 below the intake valve pick-up station S10 where a manipulator or industrial robot hand 4 grips the valve stem 2a of an intake valve 2 and pulls up or picks up the intake valve 2 from the valve hanger plate 5 described in detail previously. The first and second hanger plate transfer units 21 and 22 vertically transfer upwardly and downwardly the valve hanger plates 5 one after another, respectively. Because the first and second hanger plate transfer units 21 and 22 are structurally identical excepting the direction of transferring the valve hanger plates 5, the following description will be directed to the first hanger plate transfer unit 21 for transferring the valve hanger plates 5 vertically upwardly.

Figure 6:
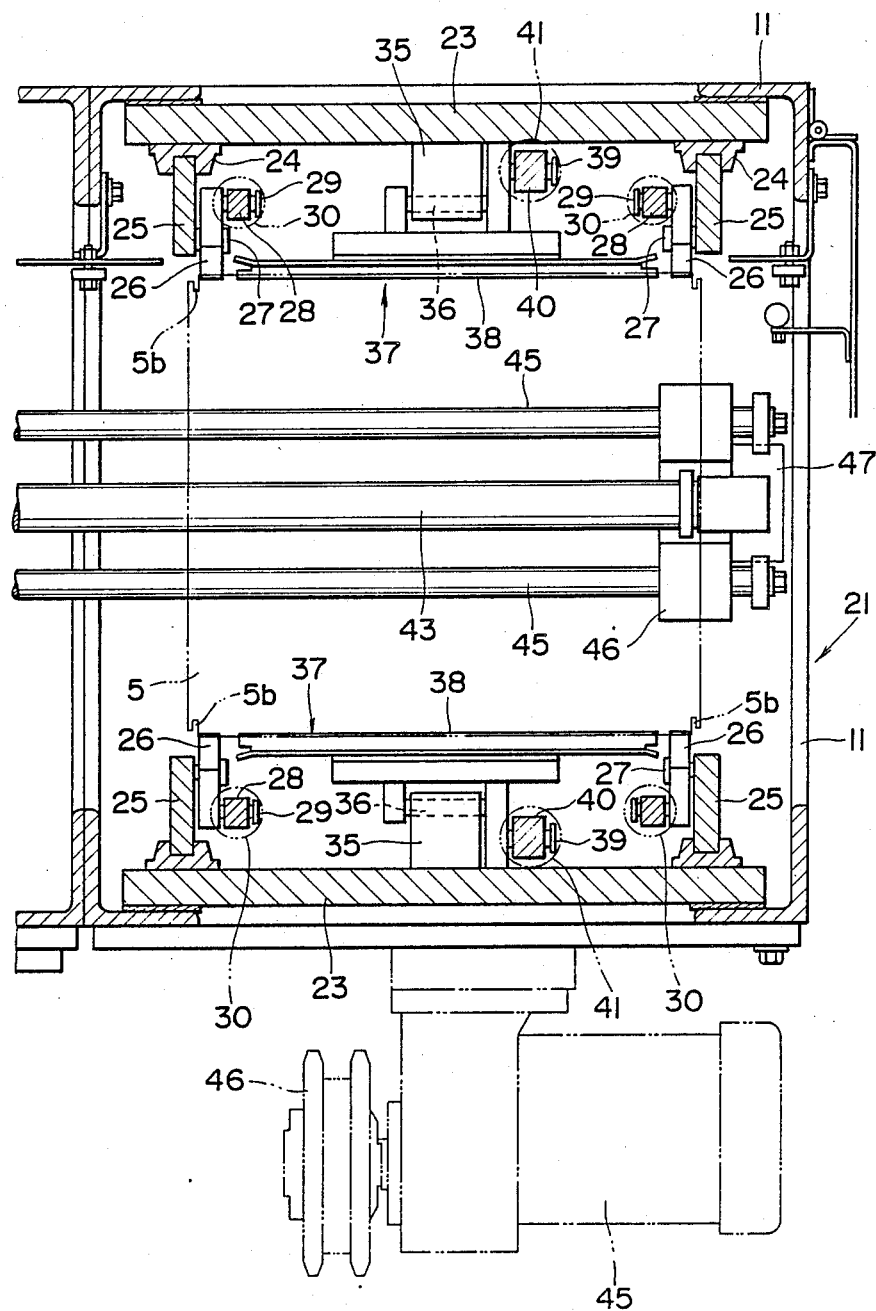
FIG. 6 is an enlarged view showing a part of the engine valve feed apparatus shown in FIG. 3.
Figure 7:
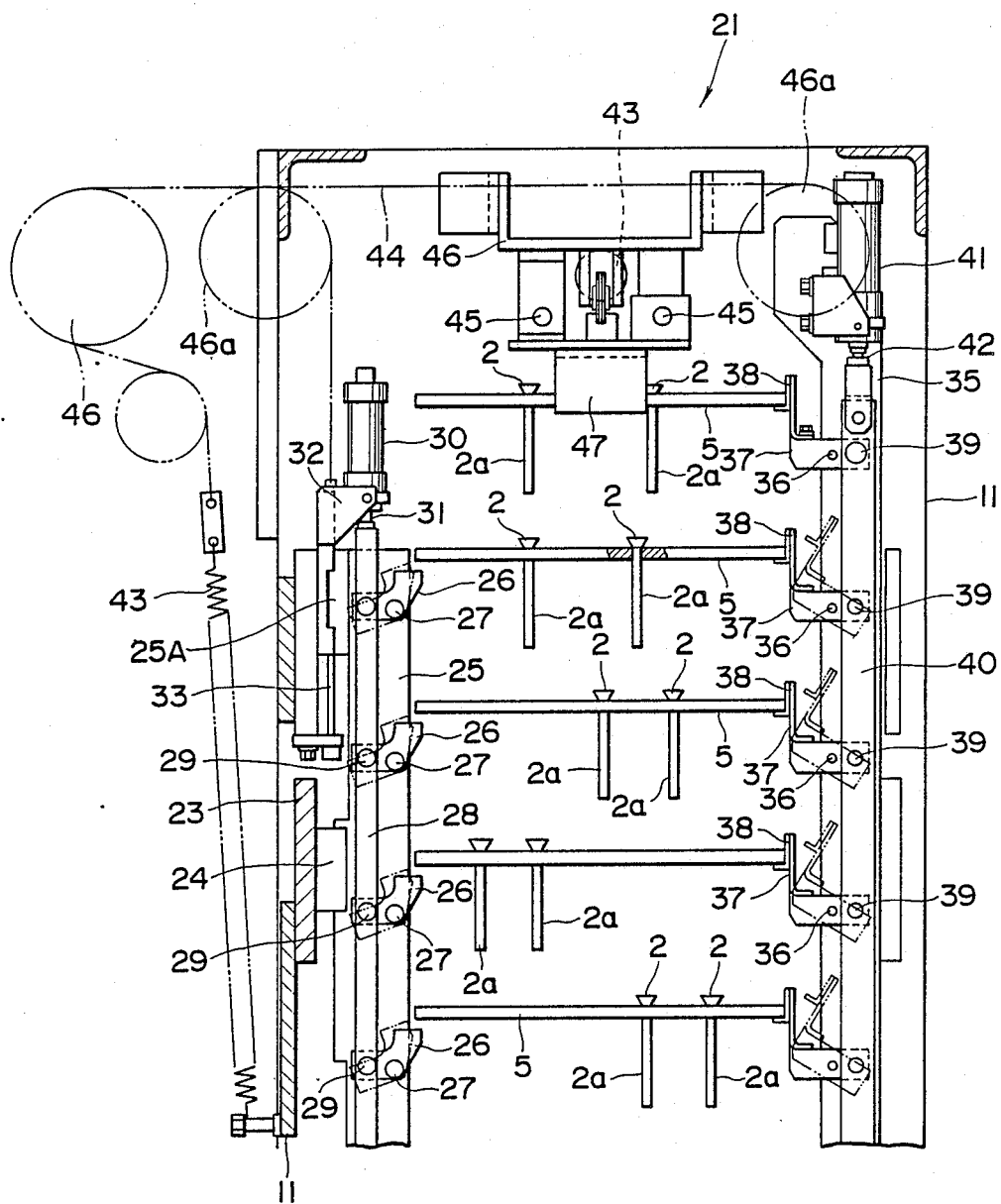
FIG. 7 is a schematic illustration showing the interior mechanism of the engine valve feed apparatus shown in FIG. 3.

As is partially drawn in detail on an enlarged scale in FIGS. 6 and 7, the first hanger plate transfer unit 21 is provided with a plurality of transverse support plates 23 (only one of which is shown in FIG. 7 for clarity) which are secured to the inner surfaces of both side frames of the housing 11 at regular vertical spacings. Each support plate 23 has a pair of vertically extending guide rails 24 formed with a female guide groove for vertically slidably supporting a pair of vertically extending slidable beams 25. Each pair of slidable beams 25 are provided with a plurality of sets of generally L-shaped hooks 26 pivotally mounted for rotation on shafts 27 fixed thereto in a vertical line at regular spacings. Each hook 26 has a tail end pivotally mounted on a shaft 29 secured to a first connecting beam 28 shiftable up and down and movable relative to the slidable beam 25. The first connecting beam 28 is joined at its upper end to a piston rod 31 of a first, air operated cylinder 30 and is thereby alternatively shifted up and down. The retracting motion of the piston rod 31 of the first cylinder 30 causes the upward-movement of the first connecting beam 28, rotating the hooks 26 in the clockwise direction about the shafts 27 to a position shown by a solid line in FIG. 6 where one set of the hooks 26 of four slidable beams 25 are located at the vertices of a spatial square plane to support the hanger plate 5 (as shown by a phantom line in FIG. 6) thereon. On the other hand, the protruding motion of the piston rod 31 of the first cylinder 30 causes the downward-movement of the first connecting beam 28, rotating the hooks 26 in the counterclockwise direction to a position shown by a phantom line in FIG. 7 where the set of the hooks 26 escape from the hanger plates 5.

As is clearly shown in FIG. 7, the slidable beam 25 has a bracket 32 secured to its upper end to which the first cylinder 30 is fixedly secured. The bracket 32 is suspended with one end of a chain belt 44 of which the other end is retained with a biasing spring 43. The chain belt 44 is driven by means of an output sprocket 46 of a reversible motor 45 mounted on the top of the housing 11 through a free sprocket 46a. The motor 45 can intermittently alternately rotate in the opposite directions to lift up and down the slidable beam 25 by a regular distance substantially equal to the regular spacing by which the adjacent shafts 27, and hence the hooks 26 are apart from each other. Near the upper end the slidable beam 25 is provided with a step 25A which abuts against an adjustable stopper stud 33. The stopper stud 33 is adjusted in vertical position to properly locate the hooks 26 in vertical position when the slidable beam 25 is lifted down.

Each support plate 23 fixedly holds thereon at its middle section a vertically extending column 35. At substantially the same levels with respect to the hooks 26, the column 35 supports a plurality of carrier brackets 37 having a generally L-shaped cross section pivotally mounted on shafts 36 secured thereto, respectively. Each L-shaped bracket 37 fixedly mounts an elongated carrier member 38 having a generally L-shaped cross section. The L-shaped brackets 37 at their arm section are pivotally mounted on shafts 39 located on a second connecting beam 40 in vertical line at regular spacings.

The column 35 is provided with a second, air operated cylinder 41 secured to the upper end thereof. The second connecting beam 40 is joined at its top to a piston rod 42 of the second cylinder 41 and is thereby intermittently shifted up and down. The retracting motion of piston rod 42 of the second cylinder 41 causes the upward-movement of the second connecting beam 40, rotating the L-shaped brackets 37 in the counterclockwise direction about the shafts 36 to a position shown by a solid line in FIG. 7 where each pair of the elongated carrier members 38 face to each other and can support the valve hanger plates 5 (as shown by a phantom line in FIG. 6) therebetween when the hooks 26 escape from the valve hanger plate 5. On the other hand, the protruding motion of the piston rod 42 of the second cylinder 41 causes the downward-movement of the second connecting beam 40, rotating the L-shaped brackets 37 in the clockwise direction to a position shown by a phantom line in FIG. 7 where the elongated carrier members 38 escape from the valve hanger plates 5.

The second connecting beam 40 is also coupled to the motor 45 by means of the chain belt 44 through the motor sprocket 46 and free sprockets 46a and is accordingly lifted up and down simultaneously with the slidable beam 25. Therefore, when the hooks 26 are moved up, the carrier members 37 escape from the path of movement of the valve hanger plates 5.

Figure 8:
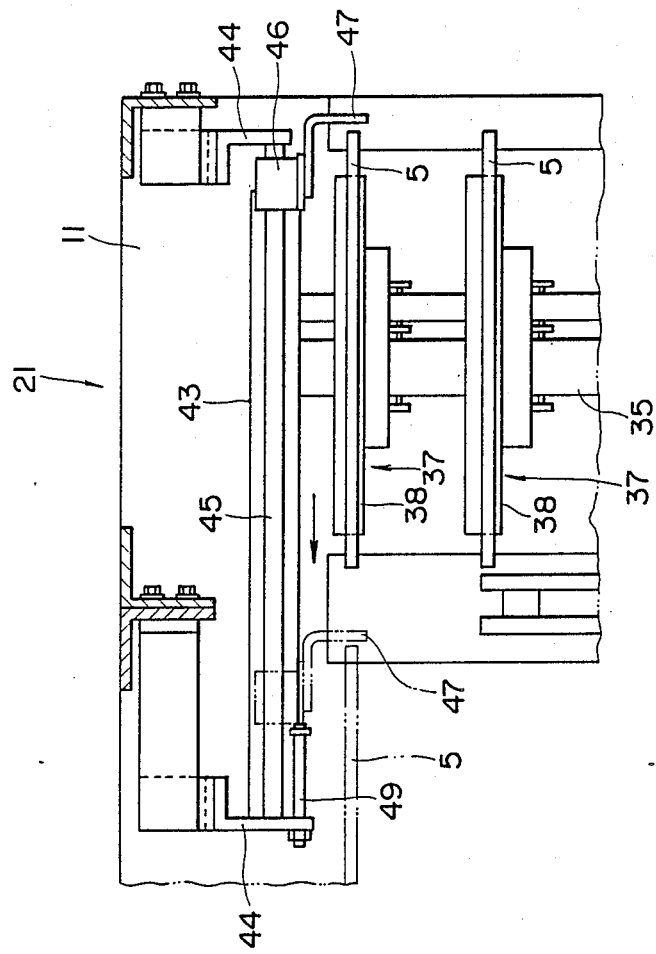
FIG. 8 is a schematic illustration showing a part of the interior mechanism shown in FIG. 7.

Referring now to FIG. 8 in association with FIG. 6, a third, air operated rodless cylinder 43 is provided over the first and second hanger plate transfer units 21 and 22 in the housing 11. The third cylinder 43 is supported by a pair of brackets 44. On both sides of and in parallel with the third cylinder 43, a pair of guide rods 45a are provided and supported between the brackets 44. The third cylinder 43 at one end has a connecting block 46 with a lug 47 secured thereto slidably mounted on the guide rods 45a. The third cylinder 43 is actuated to slide the connecting block 46 with the hooked lug 47 back and forth. As will be described later, the hooked lug 47 engages one end of the valve hanger plate 5 supported with the uppermost set of the carrier brackets 37 and pushes the valve hanger plate 5 toward the second hanger plate transfer unit 22 from the first hanger plate transfer unit 21 as is shown by a double dotted line in FIG. 8.

A plurality of the valve hanger plates 5 with the engine valves 2 hung upside down are lifted upwardly and then downwardly by the first and second hanger plate transfer units 21 and 22 in the following manner. A valve hanger plate 5 is placed on one set, for example the lowermost set, of the carrier brackets 37 of the first hanger plate transfer unit 21. The motor 45 is actuated to rotate in the normal direction to pull up the slidable beams 25 so that the lowermost set of the hooks 26 support and lift up the valve hanger plate 5 by a predetermined distance. During lifting the valve hanger plate 5, the second cylinder 41 is actuated to protrude its piston rod 42 to push down the second connecting beams 40 so as to turn all of the carrier brackets 37 in the clockwise direction as shown by a double dotted line shown in FIG. 7. When the valve hanger plate 5 is lifted up more than the predetermined distance, the second cylinder 41 is actuated and retracts its piston rod 42 to push up the second connecting beams 40 so as to turn the carrier brackets 37 in the counterclockwise direction to place them under the valve hanger plate 5 supported with the lowermost set of the hooks 26. Thereafter, the motor 45 is actuated again to rotate but in the reversed direction to lower or push down the slidable beams 25. When the slidable beams 25 are slightly lowered, the valve hanger plate 5 is placed on and supported with the second-from-the lowermost set of the carrier brackets 37. Immediately after this, the first cylinder 30 is actuated to protrude its piston rod 31 so as to lower or push down the first connecting beams 28, turning the hooks 26 in the counterclockwise direction so as to move them out of the path of movement of the valve hanger plate 5 supported with the second-from-the-lowest set of the carrier brackets 37. At the end of the lowering of the slidable beams 25 by the predetermined distance, the motor 45 stops its rotation to position the slidable beams 25 at their initial position. The valve hanger plate 5 originally placed on the lowermost set of the carrier brackets 37 is thus transferred to the second-from-the-lowermost set of the brackets 37 from the lowermost set of the carrier brackets 37. Another valve hanger plate 5 is then placed on and supported with the lowermost set of the carrier brackets 37. In this manner, the valve hanger plates 5 are transferred from the lowermost toward the uppermost set of the carrier brackets 37 stepwise.

The valve hanger plate 5 transferred to and supported with the uppermost set of the carrier brackets 37 is transferred to the second hanger plate transfer unit 22 by means of the third, rodless cylinder 43 and supported with the uppermost set of the carrier brackets 37 of the second hanger plate transfer unit 22. In the second hanger plate transfer unit 22, the valve hanger plate 5 supported with the uppermost set of the carrier brackets 37 is transferred stepwise to the lowermost set of the carrier brackets 37 of the second hanger plate transfer unit 22 substantially in the same way as but in the opposite direction in the first hanger plate transfer unit 21. The valve hanger plate 5 transferred to and supported with the second-from-the-lowermost set of the carrier brackets 37 of the second hanger plate transfer unit 22 is then transferred horizontally to the valve pick-up station S10.

Figure 9A:
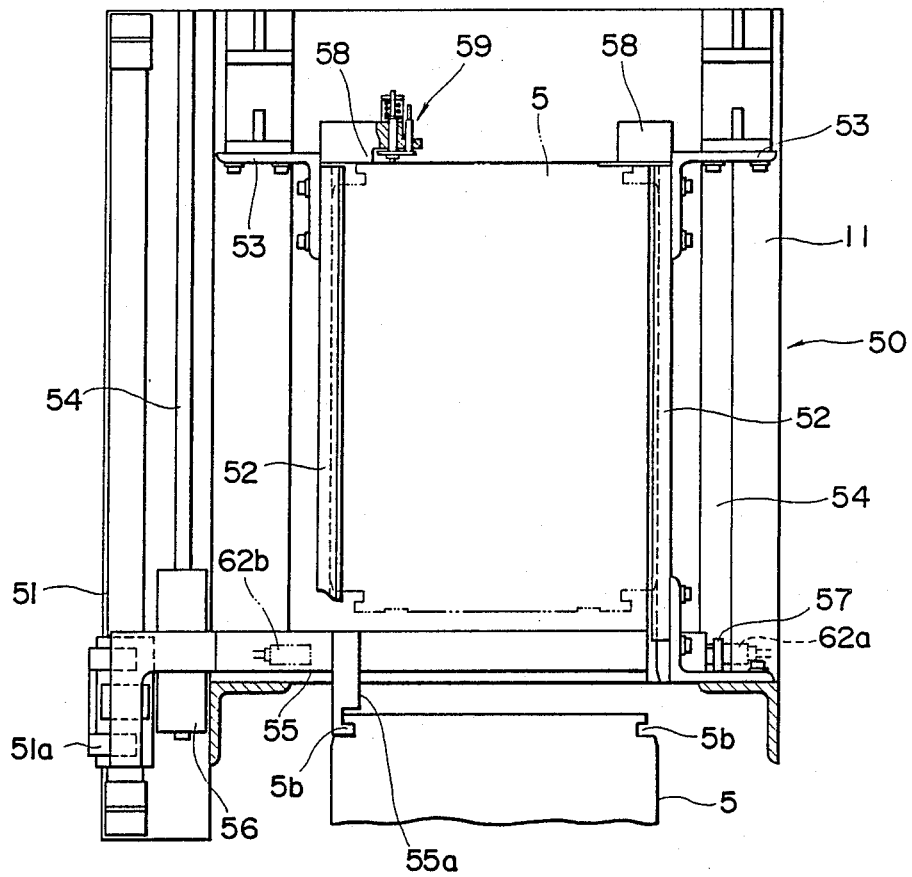
FIG. 9A is a plan view partly in schematic illustrating a horizontal hanger plate transfer unit shown in FIG. 3.
Figure 9B:
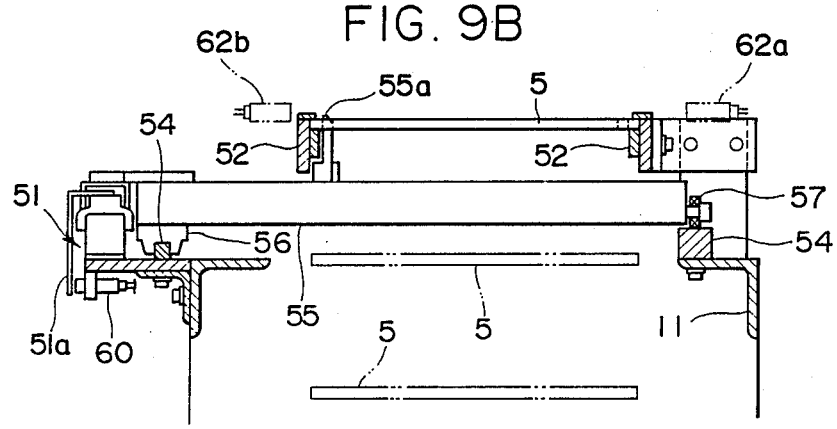
FIG. 9B is a side view partly in schematic showing the horizontal hanger plate transfer unit shown in FIG. 9A.

Referring now to FIGS. 9A and 9B, there is shown third hanger plate transfer unit 50 including a fourth, air operated rodless cylinder 51 for transferring horizontally the valve hanger plate 5 supported with the second-from-the-lowermost set of the carrier brackets 37 of the second hanger plate transfer unit 22 to the valve pick-up station S10. As shown, the third hanger plate transfer unit 50 is provided with a pair of U-shaped guide rails or members 52 attached to the frames of the housing 11 through brackets 53 for slidably supporting the valve hanger plate 5. Below the pair of guide rails 52, another pair of guide rails or members 54 are secured to the frames of the housing 11. A cross beam 55 is operationally coupled to the fourth cylinder 51 by means of a movable member 51a secured thereto and is disposed between the two pairs of guide rails 52 and 54. This cross member 51 is provided with a female guide member 56 slidably engaged with the male guide rail 54 and a guide roller 57 in rotative contact with the other guide rail 54. According to the structure of the cross beam 55, when the fourth cylinder 51 is actuated, the cross beam 55 is moved back and forth. The cross beam 55 is further provided with a lug 55a extending upwardly therefrom which is brought into engagement with the notch 5b formed in the valve hanger plate 5 when the valve hanger plate 5 is transferred to and supported with the second-from-the-lowermost set of carrier brackets 37 of the second hanger plate transfer unit 22. When the fourth cylinder 51 is actuated to slidably move the cross frame 55 backwardly, the valve hanger plate 5 with its notch 5b engaged with the lug 55a of the cross frame 55 is moved and guided by the U-shaped guide rails 52, thereby being transferred to and placed in position at the valve pick-up station S10.

The brackets 53 are provided with stopper members 58 for positioning the valve hanger plate 5 transferred to the valve pick-up station S10. One of the stopper members 58 has a position sensor switch 59 which deactuates the fourth cylinder 51 when it is turned on with the valve hanger plate 5 positioned by the stopper members 58. Another position sensor switch 60 is provided to detect the movable member 51a secured to the cross beam 55 at the forwardmost position where the lug 55a can be brought into smooth engagement with the notch 5b of the valve hanger plate 5 transferred downwardly and to deactuate the fourth cylinder 51. It is preferred to provide a valve head sensor, such as a photosensor comprising a light emitting diode 62a and a photoelectric element 62b, between the second hanger plate transfer unit 22 and the third hanger plate transfer unit 50 for detecting valve heads of the valves 2 standing on the valve hanger plate 5 when the valve hanger plate 5 is returned toward the second hanger plate transfer unit 22.

Figure 10A:
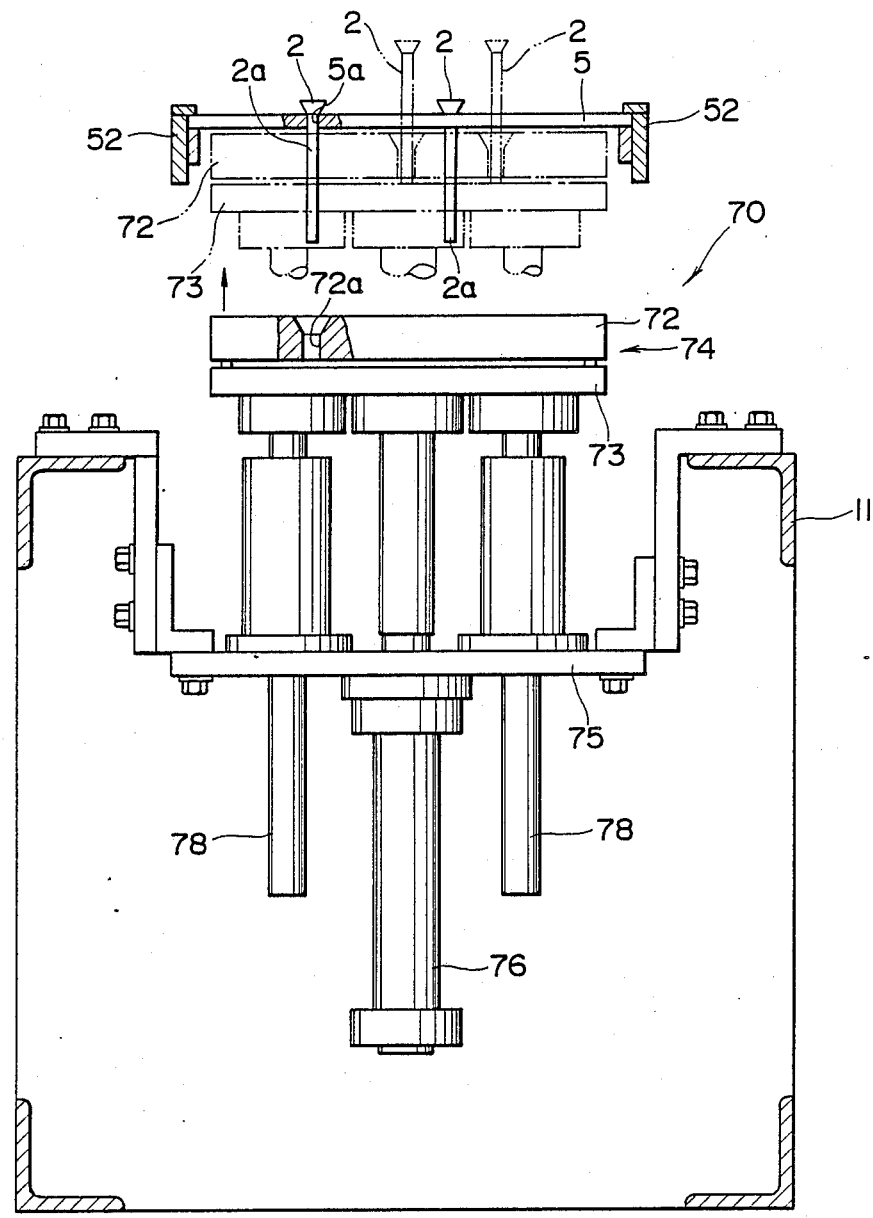
FIG. 10A is a side view showing an engine valve thrust-up unit of the engine valve feed apparatus shown in FIG. 3.
Figure 10B:
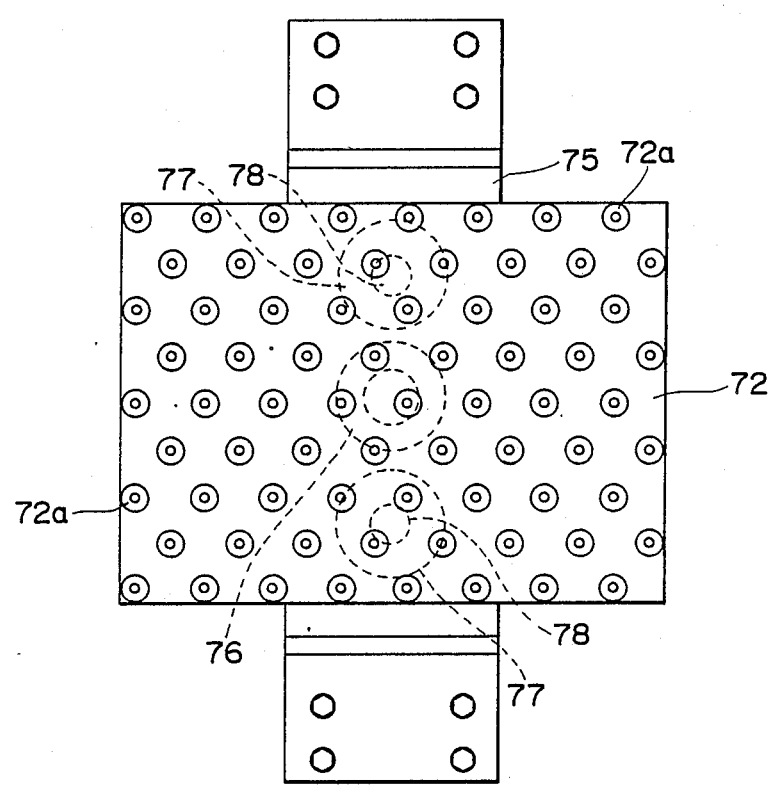
FIG. 10B is a plan view showing an engine valve holding plate of the engine valve thrust-up unit shown in FIG. 10A.

Beneath the valve pick-up station S10, a valve thrust-up unit 70 is provided in the housing 11. As shown in FIGS. 10A and 10B, the valve thrust-up unit 70 includes a thrust-up member 74 comprising a positioning plate 72 and a support plate 73 formed integrally with but spaced apart from the positioning plate 72. As is shown in detail in FIG. 10B, the positioning plate 72 is formed with a number of positioning holes 72a with a tapered edge arranged correspondingly to the holes 5a of the valve hanger plate 5. The thrust-up member 74 is fixedly mounted for up and down vertical movement on an air operated cylinder 76 secured to a cross frame 75 of the housing 11 and is supported with a pair of guide rods 78 slidably fitted in guide members 77 secured to the cross frame 75 for stable up and down vertical movement. The cylinder 76 is actuated to protrude its piston upwardly, moving the thrust-up member 74 toward the valve hanger plate 5 transferred to the valve pick-up station S10 and supported with the guide rails 54. With the upward movement of the thrust-up member 74, the positioning plate 72 receives the stem heads 2a of the valves 2 hung from the valve hanger plate 5 in the positioning holes 72a thereof, holding the valve 2 vertically or upright. With the further upward movement of the thrust-up member 74, the support plate 73 thrusts up the engine valve 2 from the valve hanger plate 5 as is shown by a phantom line in FIG. 10A. Because the valve hanger plate 5 is held by the U-shaped guide rails 52, as a stopper member, along its both sides, the valve hanger plate 5 is prevented from being forced upwardly following the engine valves 2 thrust upwardly by the thrust-up member 74 although the engine valves 2 are fitted relatively tightly in the valve holes 5a. Owing to the tapered edge of the positioning hole 72a, the stem end of the engine valve 2 can be easily received in the positioning hole 72a. The engine valves 2 standing vertically from the valve hanger plate 5 are picked up by a robot hand 4 one after another.

When all of the engine valves 2 are picked up and removed from the valve hanger plate 5, the cylinder 51 is actuated again to return the valve hanger plate 5 to the second-from-the-lowermost set of the carrier members 37. Thereafter, the valve hanger plate 5 without valves is transferred to the lowermost set of the carrier brackets 37. The valve hanger plate 5 supported with the lowermost set of the carrier brackets 37 is then transferred downwardly and seated onto a pair of L-shaped guide rails 82 of a hanger plate ejecting unit 80 disposed at the bottom of the second hanger plate transfer unit 22 in the housing 11.

Figure 11A:
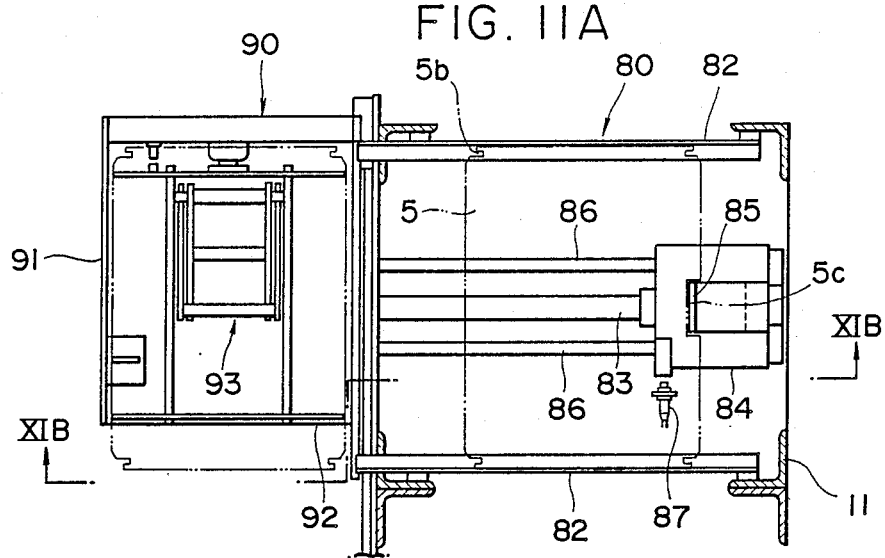
FIG. 11A is a plan view partly in schematic illustrating a hanger plate ejecting unit of the engine valve feed apparatus shown in FIG. 3.
Figure 11B:
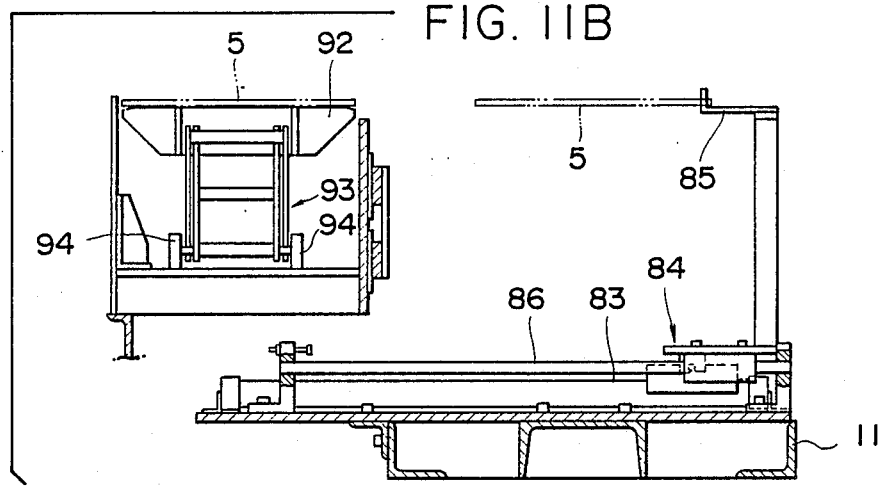
FIG. 11B is a sectional view partly in schematic, taken along a line XIB—XIB in FIG. 11A, illustrating the hanger plate ejecting unit shown in FIG. 11A.

Referring back to FIGS. 11A to 11C, the hanger plate ejecting unit 80 includes the L-shaped guide rails 82 secured to frames of the housing 11 for receiving thereon the valve hanger plate 5 transferred by the lowermost set of the carrier members 37 of the second hanger plate transfer unit 22. The hanger plate ejecting unit 80 is provided with a fifth, air operated rodless cylinder 83 which moves an associated movable member 84 with a lug 85 extending upwardly therefrom back and forth along a pair of guide rails 86. When the fifth cylinder 83 is actuated, the movable member 84 moves forwardly with the lug 85 engaging the recess 5c of the valve hanger plate 5, slidably displacing the valve hanger plate 5 toward a hanger plate container 90 placed laterally adjacent to the second hanger plate transfer unit 22 out of the housing 11. When the movable member 84 moves to a position where the valve hanger plate 5 is over the hanger plate container 90, a limit switch 87 attached to the housing 11 detects the movable member 84 to reverse the operation of the fifth cylinder 83, thereby returning the movable member 84 to its initial position.

Figure 11C:
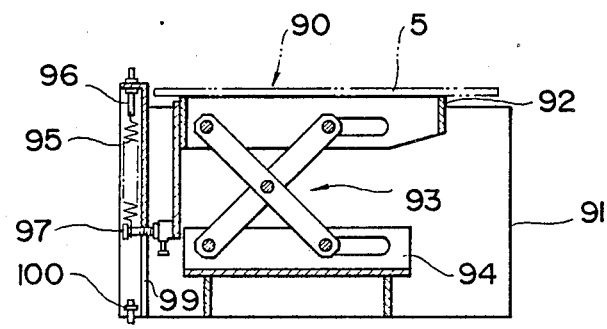
FIG. 11C is a front view illustrating a hanger plate container of the hanger plate ejecting unit shown in FIG. 11B.

Referring to FIG. 11C, the hanger plate container 90 has a hanger plate supporting frame 92 supported for vertical parallel movement by means of a link mechanism 93 mounted on a base brackets 94. The supporting frame 92 is biased or urged to move upwardly with a spring 95 which is stretched between a retainer pin 96 secured to the container housing 91 and a retainer pin 97 extending from the side plate 98 of the supporting frame 92. The wall of the container housing 91 is formed with a vertical slot 99 from the bottom to the middle through which the retainer pin 97 passes and which limits the upward movement of the supporting frame 92. When the supporting frame 92 moves up to its upper limit of movement, the upper edge of the supporting frame 92 is placed on a level with the L-shaped guide rails 82 to allow the valve hanger plate 5 to slide smoothly onto the supporting frame 92 from the L-shaped guide rails 82. When the valve hanger plate 5 is placed on the supporting frame 92, the spring 95 is expanded to lower the supporting frame 92 so as to level the upper surface of the valve hanger plate 5 with the L-shaped guide rails 82. Namely, the spring 95 is designed or adapted to lower the supporting frame by a distance equal to the thickness of the valve hanger plate 5 every time the valve hanger plate 5 is placed on the supporting frame 92. When ten valve hanger plates 5 are stacked on the supporting frame 92 in the container housing 91, a warning switch 100 is turned on by the retainer pin 97 attached to the container housing 91 to make a warning sound in a well known manner so as to indicate the removal of the stack of the valve hanger plate 5 from the container housing 91.

In the operation of the valve supply apparatus thus constructed, a plurality of the valve hanger plates 5 with a number of, for example in this embodiment 72, intake valves 2 hung upside down are loaded one on every set of the carrier brackets 37 of the first hanger plate transfer unit 22 in the valve supply apparatus 10 either at a time or one by one. The valve supply apparatus 10 is switched on to actuate all of the elements thereof, taking the following sequential operation by the aid of a computerized controller for the vehicle cylinder head assembling line shown in FIG. 1. The motor 45 of the first hanger plate transfer unit 21 is actuated to rotate in the normal direction so as to pull up the slidable beams 25 through the belt chain 44. Each set of the hooks 26 support and lift up the valve hanger plate 5. While the valve hanger plate 5 is lifted up, the second cylinder 41 is actuated to push down the second connecting beams 40 so as to turn the carrier brackets 37 to escape from the path of movement of the valve hanger plate 5. When the valve hanger plate 5 is lifted up more than a predetermined distance, the second cylinder 41 is reversely actuated to pull up the second connecting beams 40 so as to return the carrier brackets 37 to their supporting position in the path of movement of the valve hanger plate 5.

Thereafter, the motor 45 is actuated again to rotate but in the reversed direction so as to lower the slidable beams 25. When the slidable beams 25 are slightly lowered, each valve hanger plate 5 is placed on and supported with a set of the carrier brackets 37 which was previously just upper relative to each set of the carrier brackets 37. Immediately after this, the first cylinder 30 is actuated to lower the first connecting beams 28, turning the hooks 26 to escape out of the path of movement of the valve hanger plate 5 so as to allow each set of the hooks 26 to pass over the sides of each valve hanger plate 5 which is to be supported and transferred upwardly thereby. When the first connecting beams 28 are lowered to position the hooks 26 under the valve hanger plates 5, the motor 45 stops and the cylinder 30 is deactuated to pull up the slidable beam 25 so as to place each set of the hooks 26 underside each valve hanger plate 5.

Immediately after the uppermost set of the carrier brackets 37 of the first hanger plate transfer unit 21 receives the valve hanger plate 5, the third cylinder 43 is actuated to slide the connecting block 46 so as to push the valve hanger plate 5 with the lug 48 toward the second hanger plate transfer unit 22 as shown in FIG. 7. When the limit switch 49 detects the connecting block 46, it causes the third cylinder 43 to reverse the connecting block 46 toward the first hanger plate transfer unit 21. The limit switch 49 actuates also the motor 45 of the second hanger plate transfer unit 22 to rotate in the normal direction so as to pull up the slidable beam 25, lifting up the valve hanger plate 5 with the uppermost set of the hooks 26. Thereafter, the second cylinder 41 of the second hanger plate transfer unit 22 is actuated to pull slightly up the second connecting beams 40, turning the carrier brackets 37 to escape from the path of movement of the valve hanger plate 5. Then the motor 45 of the second hanger plate transfer unit 22 is reversed so as to lift down the valve hanger plate 5 toward the second-from-the-uppermost set of the carrier brackets 37. During the lifting down of the valve hanger plate 5, the second cylinder 41 is reversely actuated to pull up the second connecting beams 40 so as to return the carrier brackets 37 to their supporting position in the path of movement of the valve hanger plate 5. The motor 45 continues to rotate so as to lower the slidable beams 25 until the valve hanger plate 5 is received or placed on and supported with the second-from-the-lowermost set of the carrier brackets 37. In such a way, the valve hanger plate 5 is transferred from the uppermost to the second-from-the-lowermost set of the carrier brackets 37 of the second hanger plate transfer unit 22.

Immediately after this, the first cylinder 30 of the second hanger plate transfer unit 22 is reversely actuated to lower the first connecting beams 28, turning the hooks 26 to escape from the path of movement of the valve hanger plate 5 so as to allow the uppermost set of the hooks 26 to pass over the sides of the valve hanger plate 5 supported by the second-from-the-uppermost set of the carrier brackets 37. When the first connecting beams 28 of the second hanger plate transfer unit 22 are lowered to position the hooks 26 out of the path of movement of the valve hanger plates 5, the motor 45 of the second hanger plate transfer unit 22 is reversed to lift up the slidable beam 25 and the first cylinder 30 is actuated so as to position each set of the hooks 26 in the path of movement of the valve hanger plate 5. In this way, the valve hanger plate 5 is transferred downwardly stepwise to the second-from-the-lowermost set of the carrier brackets 37 in the second hanger plate transfer unit 22.

The valve hanger plate 5 transferred to and supported with the second-from-the-lowermost set of the carrier brackets 37 of the second hanger plate transfer unit 22 is then transferred horizontally by the third hanger plate transfer unit 50. When the fourth cylinder 51 is actuated to slidably move the cross frame 55 backwardly, the valve hanger plate 5 with its notch 5b engaged with the lug 55a of the cross frame 55 is moved and guided by the U-shaped guide rails 52 toward the valve pick-up station S10.

When the valve hanger plate 5 is placed in position at the valve pick-up station S10, the robot hand 4 is actuated to pick up the valves 2 one after another for fitting them to engine cylinder heads transferred to the intake valve fitting station S4. After all of the valves 2 hung with the valve hanger plate 5 have been picked up, the fourth cylinder 51 is actuated again to move the cross frame 55 forwardly, returning the valve hanger plate 5 to the second-from-the-lowermost set of the carrier brackets 37 of the second hanger plate transfer unit 22.

When some of the engine valves 2 are left in the valve hanger plate 5, the valve head sensor 62 detects the valve heads of the engine valves 2 standing on the valve hanger plate 5 while the valve hanger plate 5 is returned toward the second hanger plate transfer unit 22. If in fact the valve head sensor 62 detects a head, it stops the cylinder 51 and makes a warning to indicate that the valve hanger plate 5 is removed.

The valve hanger plate 5 thus returned to the second-from-the-lowermost set of the carrier brackets 37 of the second hanger plate transfer unit 22 is, after transferred to the lowermost set of the carrier brackets 37, placed on the L-shaped guide rails 82 of the hanger plate ejecting unit 80. When the fifth cylinder 83 is actuated, the movable member 84 moves forwardly with the lug 85 engaging the recess 5c of the valve hanger plate 5 to slidably displace the valve hanger plate 5 onto the supporting frame 92 of the hanger plate container 91. In this way, the valve hanger plates 5 with engine valves 2 removed are stacked on the supporting frame 92 one after another. When a predetermined number of the valve hanger plates 5 are stacked on the supporting frame 92, the warning switch 100 is turned on to make a warning sound, indicating that the valve hanger plates 5 should be removed from the hanger plate container 91.

Although the present invention has been fully described by way of the preferred embodiment thereof with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. An apparatus for feeding engine valves to a valve handling apparatus at a valve pick-up station where said valve handling apparatus picks up and fits said engine valves to an engine cylinder head one after another, said apparatus comprising:

a valve hanger plate formed with a number of valve holes for tightly receiving a number of engine valves to hang said engine valves upside down;

hanger plate transfer means for transferring a number of said valve hanger plates to said valve pick-up station one after another; and thrust-up means disposed at said valve pick up station for thrusting up said valves from said valve hanger plate transferred to said valve pick-up station so as to allow said valve handling apparatus to hold a stem of each said engine valves, said thrust-up means comprising;

holding means movable up and down and formed with a number of positioning holes for receiving therein the stem ends of said engine valves hung from said valve hanger plate to thereby hold said valves upright when moved up;

lift means for moving up and down said holding means; and a stopper for preventing said valve hanger plate from being forced up when said holding means is moved up and receives said stem ends of said engine valves hung from said valve hanger plate.

2. An apparatus as defined in claim 1, wherein said positioning holes of said holding means are formed with tapered edges.

3. An apparatus as defined in claim 1, wherein said hanger plate transfer means comprises a first transfer unit for vertically upwardly transferring said valve hanger plates stepwise, a second transfer unit for vertically downwardly transferring stepwise said valve hanger plates transferred upwardly and a third transfer unit for horizontally transferring each of said valve hanger plates transferred downwardly to said valve pick-up station.

4. An apparatus as defined in claim 3, wherein each of said first and second transfer units comprises a plurality of sets of carrier members each set of which supports one of said valve hanger plates, a plurality of sets of hook members which are removably engageable with said valve hanger plates supported with said carrier members and means for vertically lifting up and down each set of said hook members to transfer one of said valve hanger plates from one to another set of said carrier members, thereby vertically transferring said valve hanger plates stepwise one after another.

5. An apparatus as defined in claim 4, wherein each set of said carrier members are displaced from the path of vertical movement of said valve hanger plate when said valve hanger plates are vertically transferred from one to another set of said carrier members.

6. An apparatus as defined in claim 5, wherein each set of said hook members are displaced from the path of vertical movement of said valve hanger plate after said valve hanger plate is transferred from one to another set of said carrier members.

* * * * *